MACHINE FOR AUTOMATICALLY PLACING BAGS ON A WICKET

Original Filed April 24, 1967 6 Sheets-Sheet 1

INVENTOR.
LAWRENCE MACCHERONE
BY
Robertson, Bryan, Parmelee & Johnson
ATTORNEYS.

MACHINE FOR AUTOMATICALLY PLACING BAGS ON A WICKET

Original Filed April 24, 1967 6 Sheets-Sheet 2

INVENTOR.
LAWRENCE MACCHERONE
BY
Robertson, Bryan, Barnelee & Johnson
ATTORNEYS.

MACHINE FOR AUTOMATICALLY PLACING BAGS ON A WICKET

Original Filed April 24, 1967 6 Sheets-Sheet 3

INVENTOR.
LAWRENCE MACCHERONE
BY
Robertson, Bryan, Parmelee & Johnson
ATTORNEYS.

MACHINE FOR AUTOMATICALLY PLACING BAGS ON A WICKET

Original Filed April 24, 1967 6 Sheets-Sheet 4

INVENTOR.
LAWRENCE MACCHERONE
BY
Robertson, Bryan, Parmelee & Johnson
ATTORNEYS.

MACHINE FOR AUTOMATICALLY PLACING BAGS ON A WICKET

Original Filed April 24, 1967 6 Sheets-Sheet 5

INVENTOR.
LAWRENCE MACCHERONE
BY
Robertson, Bryan, Parmelee & Johnson
ATTORNEYS.

MACHINE FOR AUTOMATICALLY PLACING BAGS ON A WICKET

Original Filed April 24, 1967 6 Sheets-Sheet 6

INVENTOR.
LAWRENCE MACCHERORONE
BY
Robertson, Bryan, Parmelee & Johnson
ATTORNEYS.

United States Patent Office

Re. 27,523
Reissued Nov. 28, 1972

27,523

MACHINE FOR AUTOMATICALLY PLACING BAGS ON A WICKET

Lawrence Maccherone, Emerson, N.J., assignor to FMC Corporation, San Jose, Calif.

Original No. 3,462,026, dated Aug. 19, 1969, Ser. No. 633,126, Apr. 24, 1967. Application for reissue Mar. 20, 1970, Ser. No. 21,557
Int. Cl. B65g *57/03, 57/08*
U.S. Cl. 214—8 15 Claims

Matter enclosed in heavy brackets [ ] appears in the original patent but forms no part of this reissue specification; matter printed in italics indicates the additions made by reissue.

ABSTRACT OF THE DISCLOSURE

Machine for automatically placing bags with mounting holes on a wicket is adapted for use at the output of a high-speed bag production line. The machine comprises a revolving carriage having clamping means adapted to grasp the bag and to revolve the bag over to a position adjacent to the wicket with the mounting holes exposed and positioned to engage the legs of the wicket. A conveyor adjacent to the revolving carriage brings the bags from the output of the production line to the carriage. As the carriage revolves, actuating means close the clamping mechanism near the conveyor for grasping the bag near the mounting holes with these holes exposed, and as the carriage continues to revolve the actuating means releases the clamping means after the bags have been individually engaged on the wicket. The revolving movement serves advantageously to cool the regions of the bag which were heat sealed to form the bag in the production line.

The background of the invention

This invention has particular application to the automatic placing of bags having perforated mounting holes on a wicket at the end of a production line. In the illustrative example of the application shown the bag material originally forms a long continuous web. From this web the individual bags are made by heat-sealing and separating their side seams from the side seams of adjacent bags. This heat sealing and separating may be accomplished in various ways as will be described hereinbelow.

Heretofore, there have been systems developed for making individual bags having mounting holes. However, in such systems it was the practice to use hand labor to load the bags onto the wicket. This was slow and laborious and the bags were not always aligned properly for further use. With such prior systems, only a relatively slow output rate is achieved. Among the advantages of utilizing the present invention are those resulting from the fact of automatically wicketing individually several hundred bags in a short space of time without having their side seams stick together or with other parts of the material of the bag.

The individual bags, after having been heat sealed and separated, are warm, and a further advantage is the cooling of the heat sealed material so that the seams of the bags do not stick together when they are loaded at a fast sequence onto the wicket. In the illustrative example of the automatic machine embodying this invention, the revolving carriage is provided with clamping means for grasping the opposite extremities of the bag. From the point where the bag is grasped by the clamps and during the revolution of the carriage the bag is cooled by the draft of air as it revolves before being placed on the wicket, whereby the bags do not tend to stick at their seams as they are individually mounted on the wicket. Thus, an effective high output rate of neatly wicketed bags is achieved.

In a machine for automatically placing bags on a wicket embodying my invention there is a revolving carriage having clamping means adapted to grasp the bag with the mounting holes remaining exposed. The revolving carriage picks up the individual bags from suitably located conveying means bringing the bags to the carriage with the extremities of the bag accessible to be grasped. Actuating means are provided for closing the clamping means near the conveying means to grasp the bag on one extremity near the mounting holes and on the other extremity. The actuating means opens the clamping means after the individual bag held thereby has been engaged on the legs of the wicket, which is mounted near the revolving carriage with its legs exposed and located to have the bags placed thereon.

The clamping means on the revolving carriage as shown includes a first clamp for engaging the top of the bag near the mounting holes and a second clamp engaging near the bottom end of the bag. Associated with the revolving carriage are the actuating means such as a cam having a first part for closing the clamps near the bag conveyor and a second part for opening the clamps near the wicket. The first and second parts of the actuating means are shown in the presently preferred embodiment as being mounted on responsive cams to sequentially close and open the multiple clamps on the revolving carriage for picking up the bags in sequences at high speed and for releasing them after they have been revolved and cooled and have been engaged with the wicket.

Figure 1:
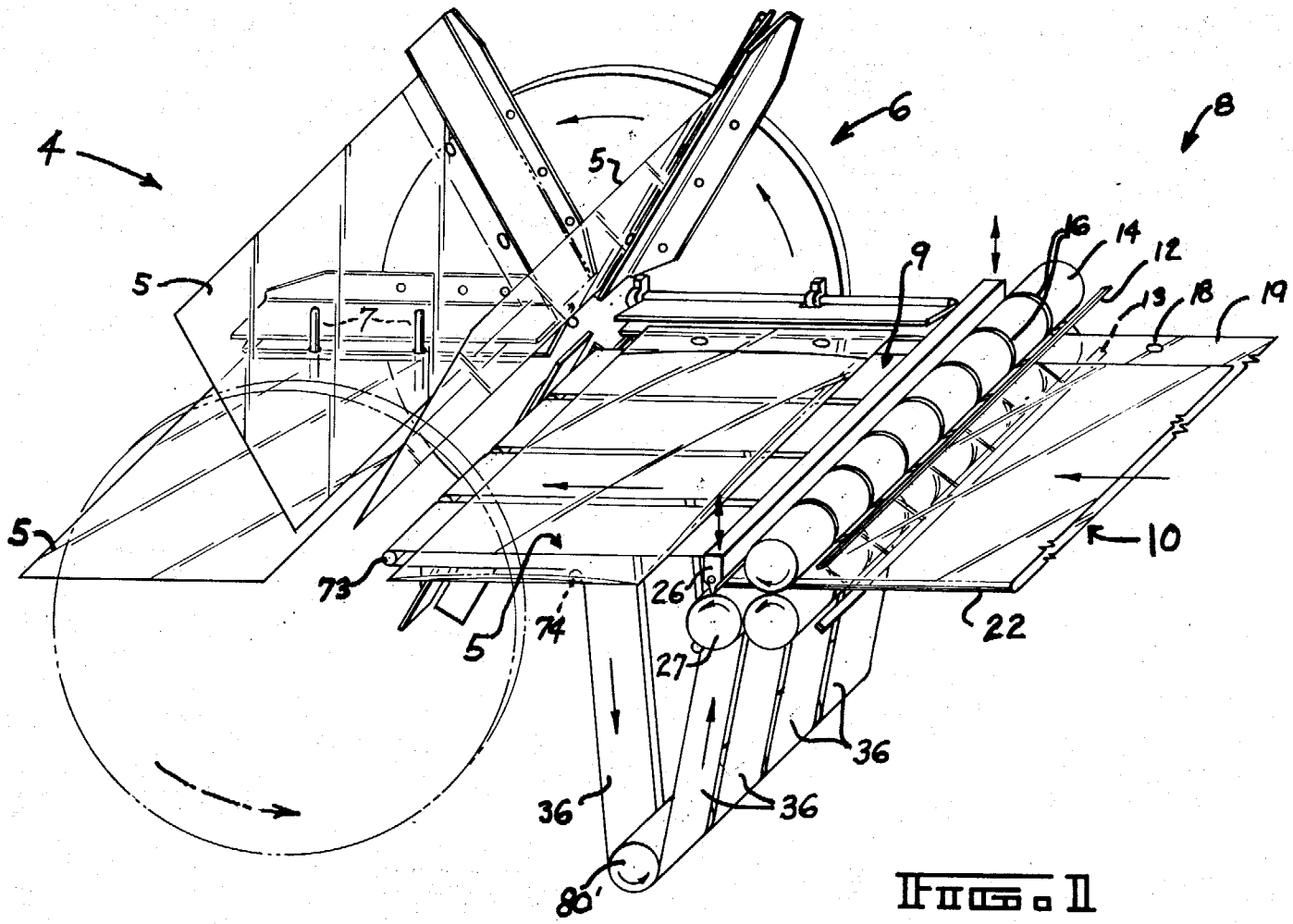
FIG. 1 is a perspective view, with certain parts omitted and some shown in dotted outline, for illustrating clearly a machine embodying the present invention and shown in use at the output of a high-speed bag-making production line.

As shown in FIG. 1, the automatic wicketing machine 4 receives the individual bags 5 and revolves them by a carriage 6 so as to move the bags to be engaged upon the upstanding legs of a wicket 7 suitably positioned adjacent to the revolving carriage 6. These individual bags 5 are fabricated at high speed in a production line 8 and are delivered onto a conveyor 9 from which they are picked up by the revolving carriage 6. This automatic machine 4 of my invention as described in detail further below may be used at the output of any high-speed bag-making production line, such as the line 8.

In the particular production-line 8 utilizing this automatic machine 4 as shown in the drawings, the individual bags 5 are made from a continuous web 10 of bag making material which is led by a pair of converging guides 12 and 13 so as to pass between a pair of opposed feed rolls 14 and 15. These feed rollers are driven and are covered by high friction material such as by rubber to provide a firm grip on the web 10. The converging guides 12 and 13 include a plurality of fingers extending forwardly into grooves 16 in the feed rolls so as to guide the web 10 into the bite of the rolls 12 and 13.

Figure 9:
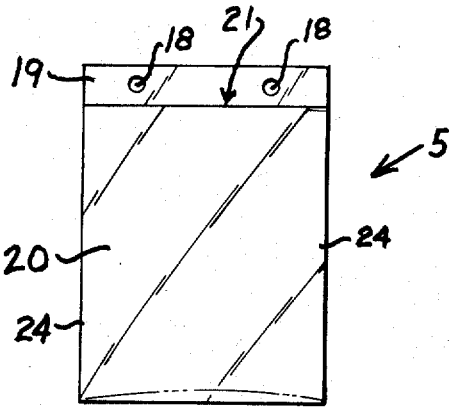
FIG. 9 shows a typical plastic bag having mounting holes that may be wicketed by the machine of the present invention.

The web 10 may be any packaging material suitable for making bags, for example such as the bags 5 (FIG. 9) having mounting holes 18 therein. In this particular example the mounting holes are located in a flap 19 at the top end of the bag which has a bag or container portion 20 located below the flap with an open mouth 21 into the interior of the bag positioned adjacent to the flap.

The web 10 includes surfaces of heat-sealable material for forming the seams or welds of the individual bags. Thus, the web may be paper or the like packaging material coated with heat sealable material or the web may be composed of plastic which is heat fusible. In the illustrative example the web 10 is shown as being transparent plastic capable of being heat sealed and severed to form the individual bags 5. The web is folded longitudinally along one side at 22 so as to form the closed bottom end of the bags, when they have been completed and separated one from another. Along the other longitudinal side of the web there is a projecting flap portion 19 which forms the flap on each bag.

This flap portion 19 is perforated at spaced points to provide the mounting holes by utilizing suitable perforating apparatus such as shown in U.S. Patent No. 2,850,093.

Figure 2:
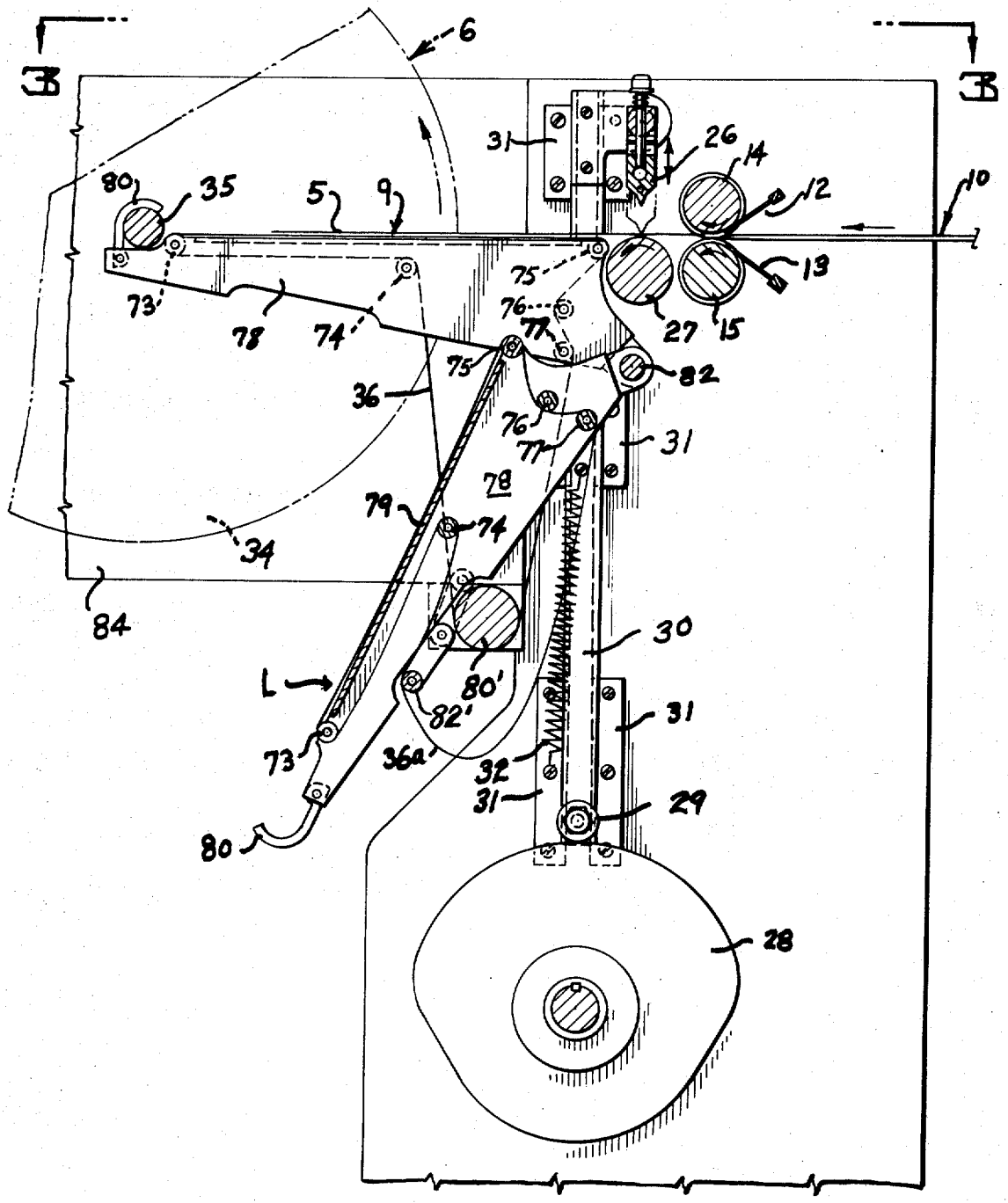
FIG. 2 is a partial sectional view taken along the line 2—2 of FIG. 3 and showing a side elevation of the conveying means and bag-forming means of the system illustrated in FIG. 1.

As shown in FIG. 2, the side seams 24 of the individual bags are formed by a vertically reciprocating heater bar 26 working in opposition to an anvil roll 27. This sealing and cut-off bar 26 is heated by an electrical heater in a manner known in the art. It is driven up and down by a drive cam 28 at each side of the line 8 engaging a cam follower roller 29 mounted on a vertically [reciprocatable] *reciprocable* link 30 which is slidably held by guides 31 and is urged downwardly by a spring 32.

The action of the heater bar 26 severs each bag 5 from the next one. The individual bag is then conveyed by the conveyor 9 into operative relationship with the revolving carriage 6 so as to be picked up from the conveyor 9. This conveyor 9 is described in detail further below.

The perforating mechanism and the feed of the web 10 are so controlled with respect to the operation of the reciprocating bar 26 that the pair of mounting holes 18 are accurately located in the same respective positions in each flap of each bag. This type of synchronizing control is well known in the bag making art. Also, the web 10 may be pre-printed with suitable information about the product to be packaged so that each bag 5 contains the desired information to be read by the customer.

Figure 3:
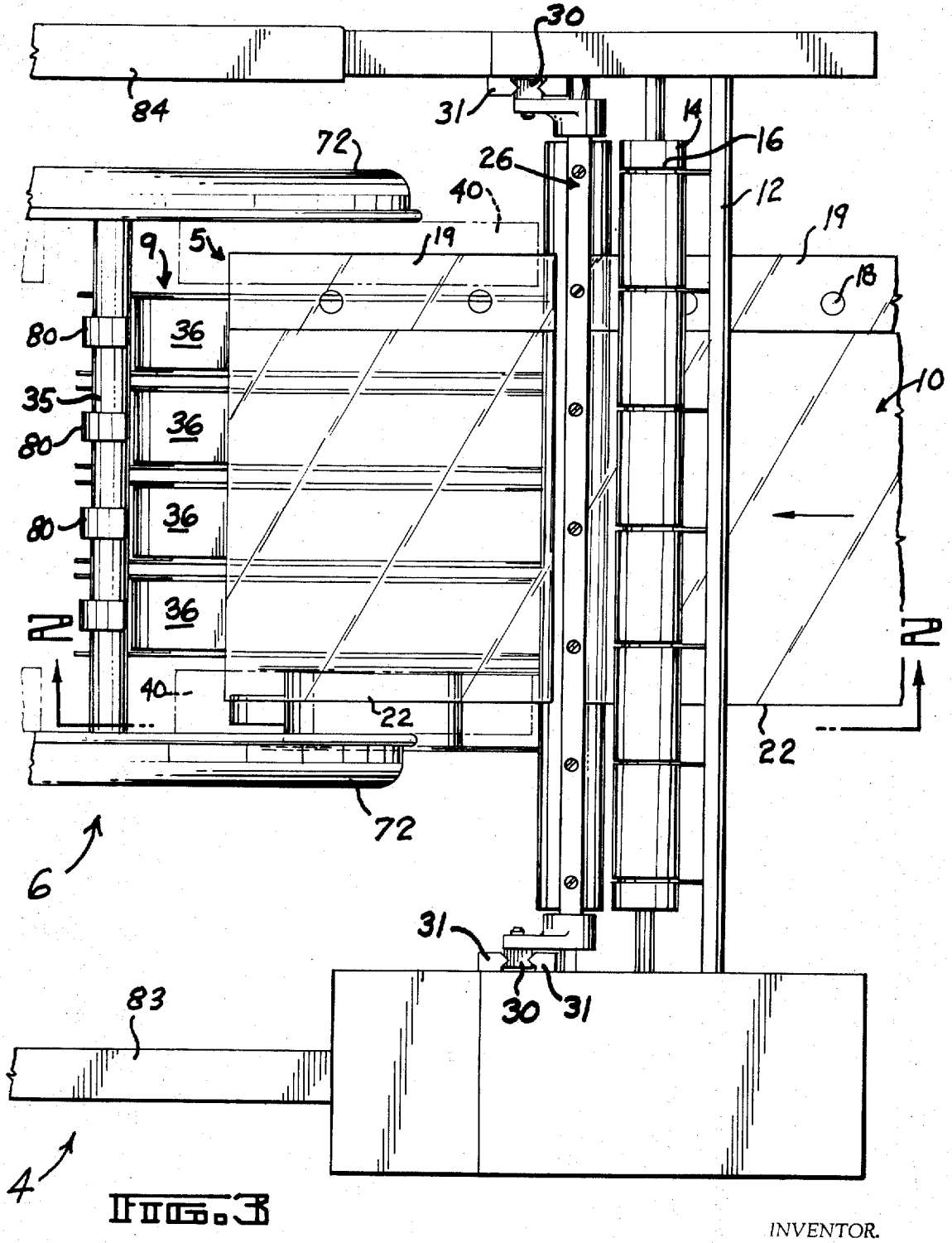
FIG. 3 is a plan view of the system illustrated in FIG. 2, being taken along the line 3—3 in FIG. 2.

The carriage 6 includes a pair of large revolving disc members 34 which are mounted on an axle 35 and the conveyor 9 projects forwardly between these two disc members. The overall width of this conveyor 9 (as seen in FIG. 3) is less than the extent or length of the bag 5 so that the top end 19 of the bag projects in cantilever relationship beyond one side of the conveyor 9, and the bottom end 22 projects in similar relationship beyond the other side of this conveyor.

Figure 4:
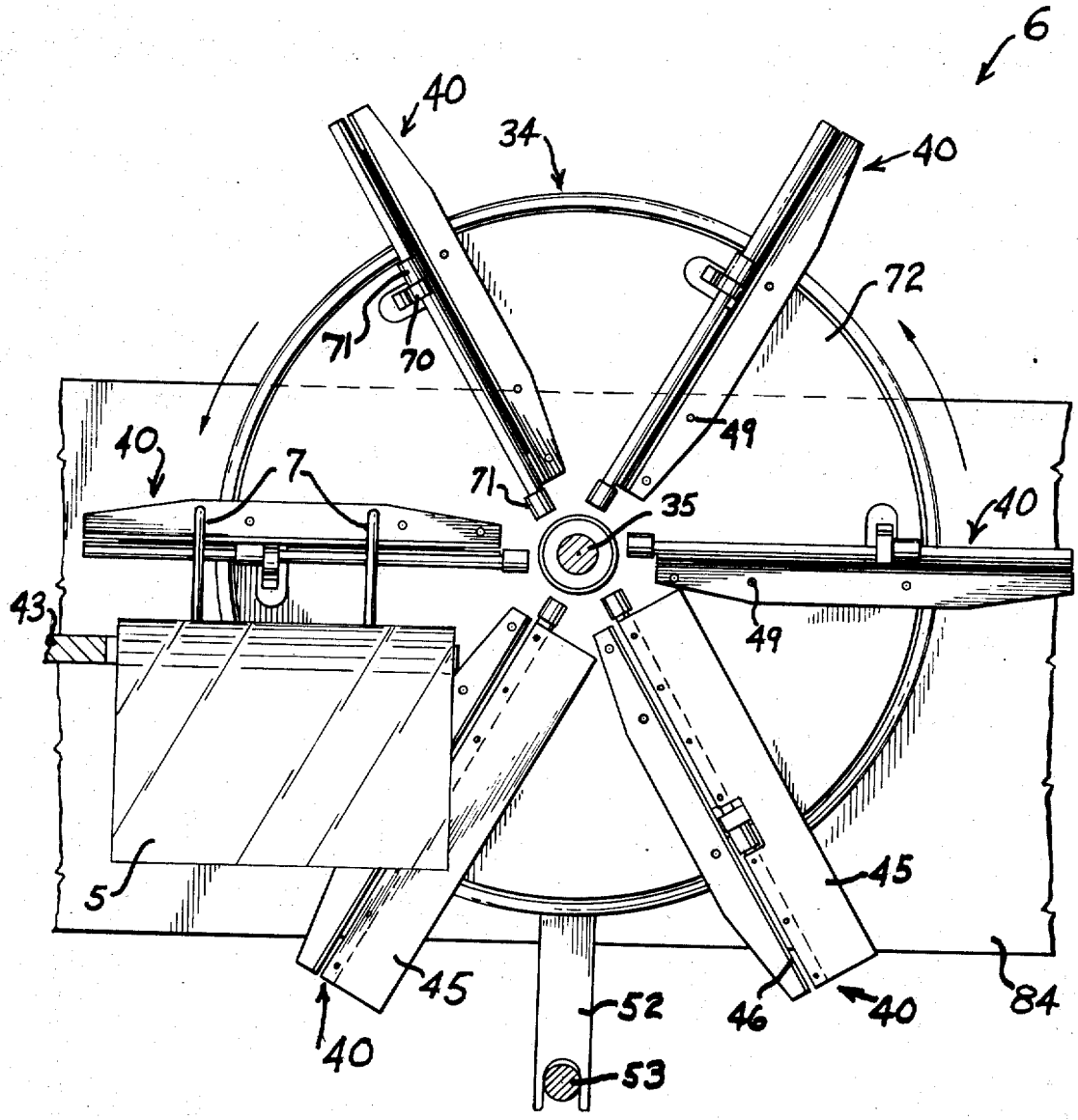
FIG. 4 is a cross-sectional view taken through the revolving carriage illustrating the cooperative action of the clamping means thereon and the wicket being loaded with bags.
Figure 5:
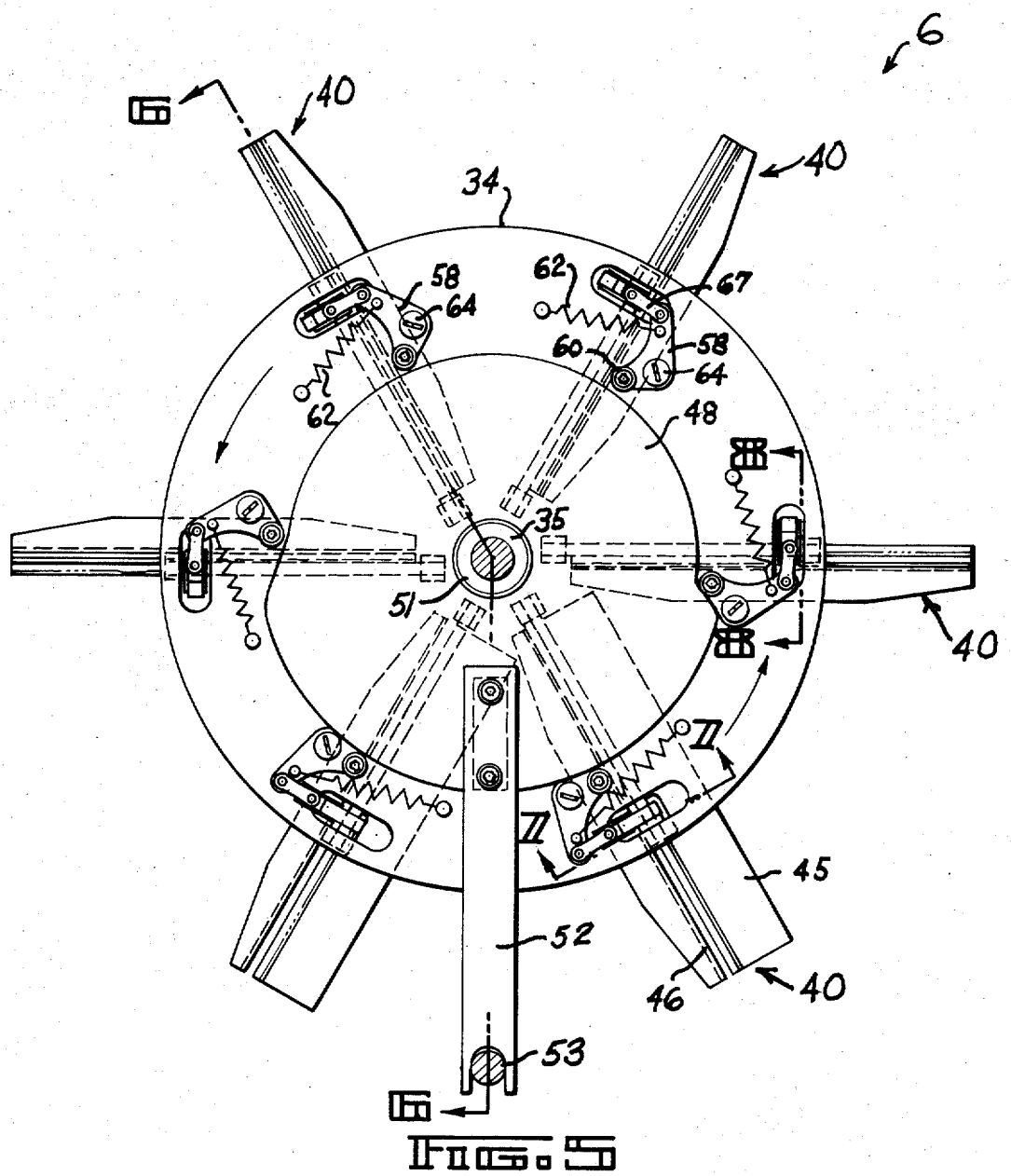
FIG. 5 is an exterior view of one end of the revolving carriage with the cover removed to show the actuation and various positions for each set of clamps.

As shown in FIGS. 4 and 5, each of the large revolving discs 34 has a plurality of clamping means 40, specifically shown as six sets of clamps which extend radially on the respective disc 34 and project inwardly toward the other disc so that they can grip the top and bottom of a bag 5 resting on the belts 36 of conveyor 9. As shown in FIG. 5, the top and bottom of a bag overhang the belts 36, as mentioned, and with this arrangement a bag 5 resting on these belts may be grasped along the top and bottom ends by the pairs of clamps 40.

After the individual bags 5 are grasped by the sets of clamps 40, they are revolved toward and placed on [a] *the* wicket 7 mounted on a bracket 43 between the discs 34. The wicket has two legs exposed to go through the mounting holes 18 of the individual bags 5.

The clamps 40 (FIGS. 7 and 8) each include two opposed plates or jaws 45 and 46, with the jaw 45 being hinged by a pivot rod 47 and the other jaw being rigidly secured by a flange and screws 49 to the disc 34.

In operation, as two discs 34 are revolved simultaneously by the shaft 35, the cooperating pairs of clamps 40 are open as they pass by the conveyor 9. Just as the clamps are opposite the top and bottom of the bag 5 resting on the belts 36, a pair of stationary cams 48 (FIG. 5) cause the two sets of clamps 40 to close to grip the top and bottom of the bag 5. The discs 34 continue to revolve, and the bag is carried up and over toward the wicket 7. When the next two sets of clamps reach the level of belts 36, they are actuated by the cams 48 so that they close to grip the top and bottom of another bag, and so forth. In operation the cams 48 serve as actuating means to open and close the respective sets of clamps 20.

As can be seen in FIGS. 4 and 5 the clamps 40 are closed at the first pick-up horizontal position and remain closed until they reach the second (release) horizontal position. As the clamps revolve past this position, they are caused to open. With this arrangement the bags are grasped and conveyed toward the wicket 7 and once placed on the wicket, the clamps are caused to open, and the bag is released.

Figure 6:
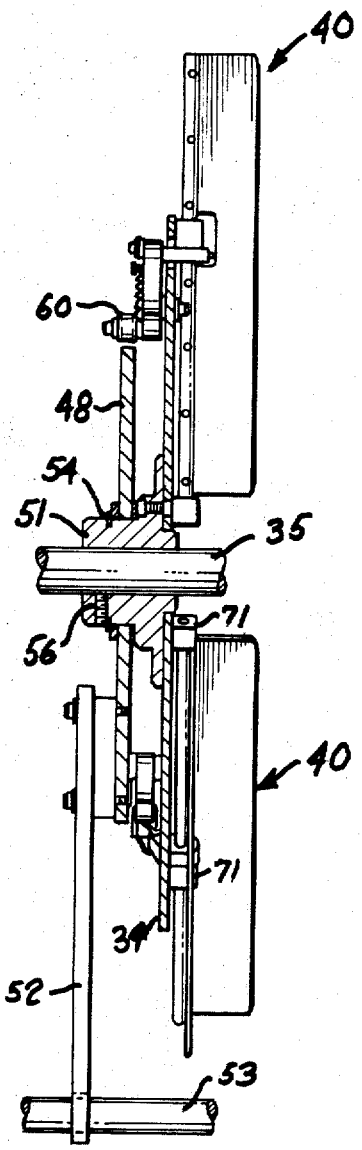
FIG. 6 is a partial sectional view of one end of the carriage, being taken along line 6—6 of FIG. 5.

When each revolving bag 5 reaches the wicket 7, the vertical legs of the wicket enter into the holes 18 in the revolving bag 5, and just at that instance the cams 48 actuate the respective clamps 40 to open them. The clamps 40 now remain open as they move down past the bracket 43 supporting the wicket, and they continue to be open (as seen in FIG. 4) until they reach the level of belts 36, when they again become closed to grip the next bag. The opposed edges of one or both of the jaws 45 nad 46 may have a rubber gripper strip 50 (FIG. 7 and 8 to increase the friction grip on the top and on the bottom of the bag. The stationary cams 48 are shown in FIGS. 5 and 6 which extend all around the axle 35, and are mounted on the hubs 51 of the discs 34 in position near the outside of the respective disc 34 being held stationary by means of a holder bar 52 engaging a fixed rod 53. A retainer 54 (FIG. 6) is seated on the hub 51 and this retainer slides against a bearing surface on the cam 48 to retain the cam as the hub rotates.

Advantageously, the width of the carriage 6 can be adjusted by changing the axial spacing between the discs 34. As seen in FIG. 6, a set screw 56 in the hub 51 is loosened from the axle 35 so that the hub can be slid along the axle to the desired position, for accommodating bags 5 of any given different length over a wide range of sizes. The holder bar 52 can slide along the fixed rod 53 when the axial position of the disc 34 is adjusted. Also, the width of the conveyor 9 can be changed, when the size of the carriage is changed, as will be explained.

The two cams 48 control pivoted levers 58 which control each of the sets of clamps 40. Because the cams 48 are stationary while the discs 34 are revolving, the respective levers 58 for each clamp 20 move with respect to the cam surface and carry a cam follower roller 60 engaging the cam surface so as sequentially to close and open the clamps 40. With this arrangement the bags are grasped once positioned on the conveying belts 36 and then are released after being placed onto the legs of the wicket 7. Each lever 42 has an associated spring 62 (FIGS. 7 and 8) which urges the lever in a direction to close the clamp 40. The cam 48, by means of engagement with the respective rollers 60 opens the clamps against the spring action. A pivot screw 64 mounts each lever 58 on the outside surface of the disc 34.

Figure 8:
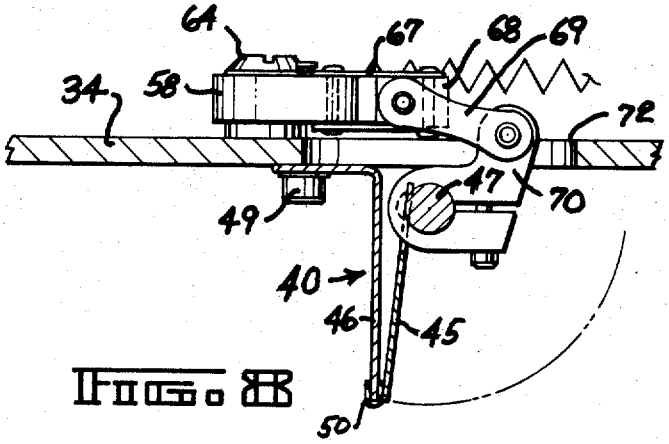
FIG. 8 is a partial section view taken along the line 8—8 of FIG. 5 and showing the actuating means closing the clamp jaws.

The structure and elements of the clamp actuating means are shown in FIGS. 5 and 8. In FIG. 5 the portion of the actuated means on the exterior of the disc 34 is shown. As can be seen, the lever 58 with the cam follower roller at one end engages the surface of the cam 48. At its other end the lever 58 is joined by a linkage 66 connected to an arm 70 extending through a hole 72 in the disc 34 and attached to the hinge rod 47.

Figure 7:
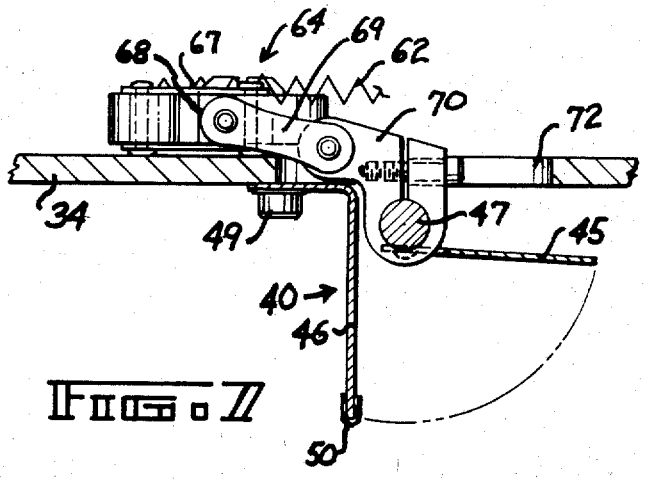
FIG. 7 is a partial sectional view taken along the line 7—7 of FIG. 5 and showing the actuating means opening the clamp jaws.

This linkage 66 includes links 67 pivotally connected to the end of the lever 58 and pivotally connected to a small universal joint block 68 which in turn is pivotally connected by links 69 to the outer end of the arm 70. This arm 70 is in the form of a clamp secured to the hinge rod 47 as seen in FIGS. 7 and 8. This hinge rod is mounted in bearings 71 (FIG. 6) on the disc 34.

A rounded cover 72 (FIG. 3) surrounds the cam 48 and covers the associated clamp actuating mechanism as described above which appear in FIG. 5 when the cover 72 is removed.

When the spacing between the discs 34 is changed to adjust the size of the carriage 6 for handling longer or shorter bags, as discussed above, the width of the conveyor 9 is correspondingly changed. This conveyor 9 includes a plurality of narrow belts 36 each of which is trained about a plurality of small rollers 73, 74, 75, 76 and 77 (FIG.2) extending between a pair of side plates 78. The side plates 78 are the downwardly extending sides of an inverted U-shaped frame having a back portion 79 which spans across between the sides 78.

The forward end of each individual frame 78, 79 is normally held by a hook 80 (FIG. 2) which removably engages over the shaft 35 so as to support these individual frames. The other end of each frame 78, 79 is mounted on a hinge shaft 82, so that when the hook 80 is released from the main shaft 35, the individual frame 78, 79 can swing down to a lower inactive position as indicated at L. When in this inactive position L the frame 78, 79 allows the narrow belt 36 carired thereby to become slack, as seen at 36a in FIG. 2.

When the hook 80 is engaged with the main shaft 35, the respective belt 36 becomes taut as seen in FIG. 2 so as to be driven by a drive roll 80'. This roll 80' is rotated at a speed to provide the desired speed rate of all of the respective belts 36 being driven thereby, as can be seen in FIG. 1. A movable roller 82' serves to lower the loop of the slack belt 36a away from the drive roll 80'.

In deciding what width of the conveyor 9 to use, it is important not to allow too much of the top and bottom of the bag to project in overhanging, i.e. cantilevered, relationship beyond the outermost conveyor belts 36. FIG. 3 indicates the correct relationship. A sufficient amount of the top and bottom extremities of the bag should be allowed to overhang so as to be conveniently engageable by the open clamps 40 which are indicated in dash and dot outline in FIG. 3. But not so much should be allowed to overhang as to cause the overhanging extremities to droop in an unmanageable fashion.

In effect the conveyor 9 is comprised of a plurality of individual conveyor belt elements 36 which can be selectively placed in an inactive position and which can be moved laterally along the shafts 35 and 82 so as to change the overall width of the conveyor 9.

The automatic wicketing machine 4 includes suitable main side frames 83 and 84 for mounting the main carriage shaft 35 and the various shafts and rolls described above. Also, suitable drive mechanism is provided, as will be understood, for rotating the feed rolls 14 and 15, anvil roll 27, the shaft of cam 28, the main shaft 35, and conveyor drive roll 80'.

It will be understood that the high-speed bag production line 8 may include any suitable bag-forming and cut-off mechanism, the particular elements shown herein being given by way of illustration.

From the foregoing it will be understood that the various features and embodiments illustrated in the drawings and described hereinabove may be altered or varied by those skilled in the art. It is to be understood that any such variations are not presumed to depart from the scope and the spirit of the invention as claimed in the appended claims.

What is claimed is:

1. A machine for automatically placing bags with mounting holes on a wicket, said machine being adapted for receiving the [baps] *bags* from a high-speed bag production line and comprising:

(a) a revolving carriage having clamping means adapted to grasp each bag at an extremity of the bag adjacent to its mounting holes;

(b) conveying means positioned adjacent to said revolving carriage for receiving the bags from the production line to bring said bags to said revolving carriage;

(c) said conveying means presenting the bags with the extremities of the bags being accessible;

(d) actuating means for closing said clamping means near said conveying means for grasping the extremities of the bags near the mounting holes;

(e) means for mounting said wicket near said revolving carriage with the legs of the wicket exposed to have the mounting holes of the bag engaged thereon;

(f) said revolving carriage carrying the bags held by said clamping means [form] *from* said conveyor means over to a second position where the mounting holes engage on the legs of the wicket; and (g) actuating means being arranged for opening said clamping means for releasing the bags near said second position for placing the bags on the wicket.

2. A machine for automatically placing bags on a wicket as claimed in claim 1 in which:

(h) said bags have been formed by heat-sealing in said production line; and (i) said revolving carriage cools the heat-sealed regions of the bag by moving the bag in an arc through the air from said conveyor means to said second position where the wicket is located.

3. A machine for automatically placing bags on a wicket according to claim 1, wherein said clamping means include opposed pairs of clamps, a first clamp of each pair for engaging the bags at one extremity near the mounting holes and a second clamp of each pair for engaging the bags near the opposite extremity.

4. A machine for automatically placing bags on a wicket according to claim 1, wherein said actuating means include a first part for closing said clamping means near said conveying means and a second part for opening said clamping means near the wicket.

5. A machine for automatically placing bags on a wicket according to claim 4, wherein said actuating means include a stationary cam extending around the axis of said revolving carriage, said cam including said first and second parts, and said revolving carriage carrying a cam follower engaging said cam for sequentially closing and opening said clamping means as said carriage revolves with respect to said stationary cam.

6. A machine for automatically placing bags on a wicket according to claim 5 in which said revolving carriage includes a hub mounted upon a shaft extending along the axis of the carriage, said hub being adjustable along the length of said shaft for changing the size of said carriage for handling a wide range of sizes of bags, said stationary cam being mounted on said hub and being retained thereof to be adjusted in position when said hub is adjusted, and means for maintaining said cam stationary while said carriage revolves.

7. A machine for automatically placing bags on a wicket as claimed in claim 1 in which said revolving carriage includes a pair of revolving members mounted upon a main shaft to be revolved thereby, said clamping means being carried by disc members and projecting inwardly from each of said members, said conveying means extending forwardly between said revolving members and presenting one extremity of the bag accessible near one of said members and the other extremity of the bag accessible near the other of said members, whereby the clamping means carried by the respective revolving members are adapted to grasp the two extremities of the bag.

8. A machine for automatically placing bags on a wicket as claimed in claim 7 in which said revolving members are adjustable in position along said main shaft for adjusting the axial spacing between said revolving members to handle bags of different lengths, said conveying means being adjustable in width corresponding to the length of the bags being handled to allow a portion of each extremity of the bag to overhang beyond the conveying means to be accessible for grasping by said clamping means.

9. A machine for automatically placing bags on a wicket as claim in claim 8 in which said conveying means includes a plurality of narrow conveyor belts, a separate frame for carrying each belt, each of said frames being movable from an active position to an inactive position, and a drive roll in driving relationship only with the belts which are carried by those frames in the active position, whereby said conveying means at any given width adjustment effectively includes only these frames which are in the active position and whose belts are all simultaneously driven by said drive roll.

10. A machine for automatically placing bags with mounting holes on a wicket and being adapted for receiving the bags at the output of a bag production line, said machine comprising:

(a) conveyor means for receiving the bags;

(b) said conveyor means having a width less than the length of the bag so that the top and bottom of the bag both project in overhanging relationship beyond the width of the conveyor means;

(c) a revolving carriage having a pair of spaced revolving members positioned to revolve near the opposite sides of said conveyor means;

(d) a plurality of clamping means carried by each of said revolving members and projecting inwardly from each revolving member in position for said clamping means to engage the top and bottom of the bags being conveyed by said conveyor means;

(e) actuating means for closing the respective clamping means as they pass near said conveyor means for grasping the top and bottom of the bag;

(f) said revolving members carrying the bag spanned between their respective clamping means and moving the bag along an arc through the air to a second position;

(g) a bracket near said second position;

(h) a wicket mounted on said bracket having its legs exposed at said second position for engaging in the mounting holes of the bags being carried by said revolving carriage; and (i) actuating means for opening the responsive clamping means as they pass said second position for releasing the top and bottom of the bag being engaged by the legs of the wicket.

*11. An apparatus for stacking thin filmy bags provided with mounting holes onto wicket pins as they are produced by a bag making machine, comprising a stacking station having means for mounting wicket pins to project upwardly, and a revolving carriage including means for grasping the bags along opposed edges for transferring and impaling the bags on said pins located at said stacking station.*

*12. The apparatus according to claim 11 wherein said carriage comprises pairs of axially spaced spokes located to grasp the opposed edges of the bag immediately after the bag is produced.*

*13. The apparatus according to claim 11 wherein said revolving carriage moves the bags grasped thereby in a generally circular arc of substantially 180°.*

*14. The apparatus according to claim 11 in which the thin filmy bags are formed from heat sealed and severed thermoplastic, wherein said revolving carriage after receiving the bags from the bag machine retains said thin filmy bags on said carriage for a sufficient period of time for cooling the bag heat seals before the bag is impaled on said pins at said stacking station.*

*15. A machine for automatically placing bags with mounting holes on spaced pins, said machine being adapted for receiving bags from a bag machine, comprising a revolving carriage having pairs of axially spced spokes, bag pick-up means on said spokes for grasping each bag at an extremity of the bag adjacent to its mounting holes; conveying means positioned adjacent to said revolving carriage for receiving the bags from the bag machine to bring said bags to said revolving carriage; said conveying means presenting the bags with the extremities of the bags being accessible for engagement by said pick-up means; and means for mounting said spaced pins near said revolving carriage so that the bags are engaged on said pins; said revolving carriage carrying the bags from said conveyor means over to a position where the mounting holes engage said spaced pins.*

References Cited

The following references, cited by the Examiner, are of record in the patented file of this patent or the original patent.

UNITED STATES PATENTS

| | | | |
|---|---|---|---|
| 1,646,571 | 10/1927 | Avis | 214—8 X |
| 2,971,874 | 2/1961 | Canno | 93—35 X |
| 3,431,828 | 3/1969 | Crawford et al. | 93—93.3 X |
| 3,424,113 | 1/1969 | Dickmann | 214—8 X |
| 2,337,528 | 12/1943 | Stuckert et al. | 198—210 |
| 2,939,572 | 6/1960 | Wurgaft | 198—210 |
| 3,075,634 | 1/1963 | Schwacofer | 198—210 |
| 3,203,326 | 8/1965 | Obenshain. | |

ROBERT J. SPAR, Primary Examiner

U.S. Cl. X.R.

198—210; 271—69, 80